United States Patent

Huang

[11] Patent Number: 6,139,234
[45] Date of Patent: Oct. 31, 2000

[54] CARGO POSITIONING DEVICE

[76] Inventor: Ching Shui Huang, P.O. Box 63-247, Taichung, Taiwan

[21] Appl. No.: 09/395,648

[22] Filed: Sep. 14, 1999

[51] Int. Cl.[7] ....................................................... B60P 7/08
[52] U.S. Cl. ............................................ 410/103; 410/100
[58] Field of Search ............................. 410/12, 100, 103, 410/106, 97, 101; 254/223, 243, 247, 323; 24/68 CD, 265 CD; 248/499

[56] References Cited

U.S. PATENT DOCUMENTS

| | | | |
|---|---|---|---|
| 2,946,563 | 7/1960 | Eaton | 410/103 X |
| 3,053,508 | 9/1962 | Schultz | 410/103 |
| 3,099,055 | 7/1963 | Huber | 410/103 |
| 3,409,263 | 11/1968 | Jantzen | 410/103 |
| 3,428,331 | 2/1969 | Morgan et al. | 410/100 |
| 3,697,045 | 10/1972 | Farley | 410/103 |
| 4,382,736 | 5/1983 | Thomas | 410/104 |
| 4,913,608 | 4/1990 | Royball | 410/103 |
| 5,156,506 | 10/1992 | Bailey | 410/100 |
| 5,542,798 | 8/1996 | Rawdon et al. | 410/100 |
| 5,560,086 | 10/1996 | Huang | 24/68 CD |
| 5,860,777 | 1/1999 | Walsh et al. | 410/100 |

*Primary Examiner*—Stephen T. Gordon
*Attorney, Agent, or Firm*—Alan Kamrath; Oppenheimer Wolff & Donnelly LLP

[57] ABSTRACT

A cargo positioning device includes a base including two side walls having aligned first notches and aligned second notches. A pivotal member includes two side walls and a handle for manual operation. The side walls of the pivotal member includes aligned cams, aligned slots, and aligned restrainers. A latch plate has two lateral sides slidably guided in the slots of the pivotal member, respectively. Each lateral side has a catch. An engaging section is formed between the lateral sides of the latch plate. A spindle is rotatably extended through the side walls of the base. The spindle is connected with the cams on the pivotal member to rotate therewith. A cargo strap has an end securely attached to the spindle and is releasably wound around the spindle. Two ratchet wheels are mounted on the spindle to rotate therewith. A braking member is pivotally mounted to the base and includes two side walls each having a braking section for releasably engaging with an associated ratchet wheel. When the engaging section of the latch plate is engaged with the first notches, the catches of the latch plate are disengaged from the ratchet wheels and the cams of the pivotal member urge the braking sections of the braking member to a position disengaged from the ratchet wheels, thereby allowing rapid pulling of the cargo strap. When the engaging section of the latch plate is engaged with the second notches, the catches of the latch plate are engaged with the ratchet wheels and the restrainers of the pivotal member urge the braking sections of the braking member to engage with the ratchet wheels, thereby preventing rotation of the spindle. When the engaging section of the latch plate is neither engaged in the first notches nor engaged in the second notches, the catches of the latch plate engage with the ratchet wheels and the braking sections of the braking member are engaged with the ratchet wheels, thereby allowing rotation of the spindle for tightening the cargo strap.

8 Claims, 12 Drawing Sheets

CARGO POSITIONING DEVICE

BACKGROUND OF THE INVENTION

1. Field of the Invention

The present invention relates to a cargo positioning device that allows rapid pulling of the cargo strap and that may reliably retain the cargo strap in place.

2. Description of the Related Art

Figure 1:
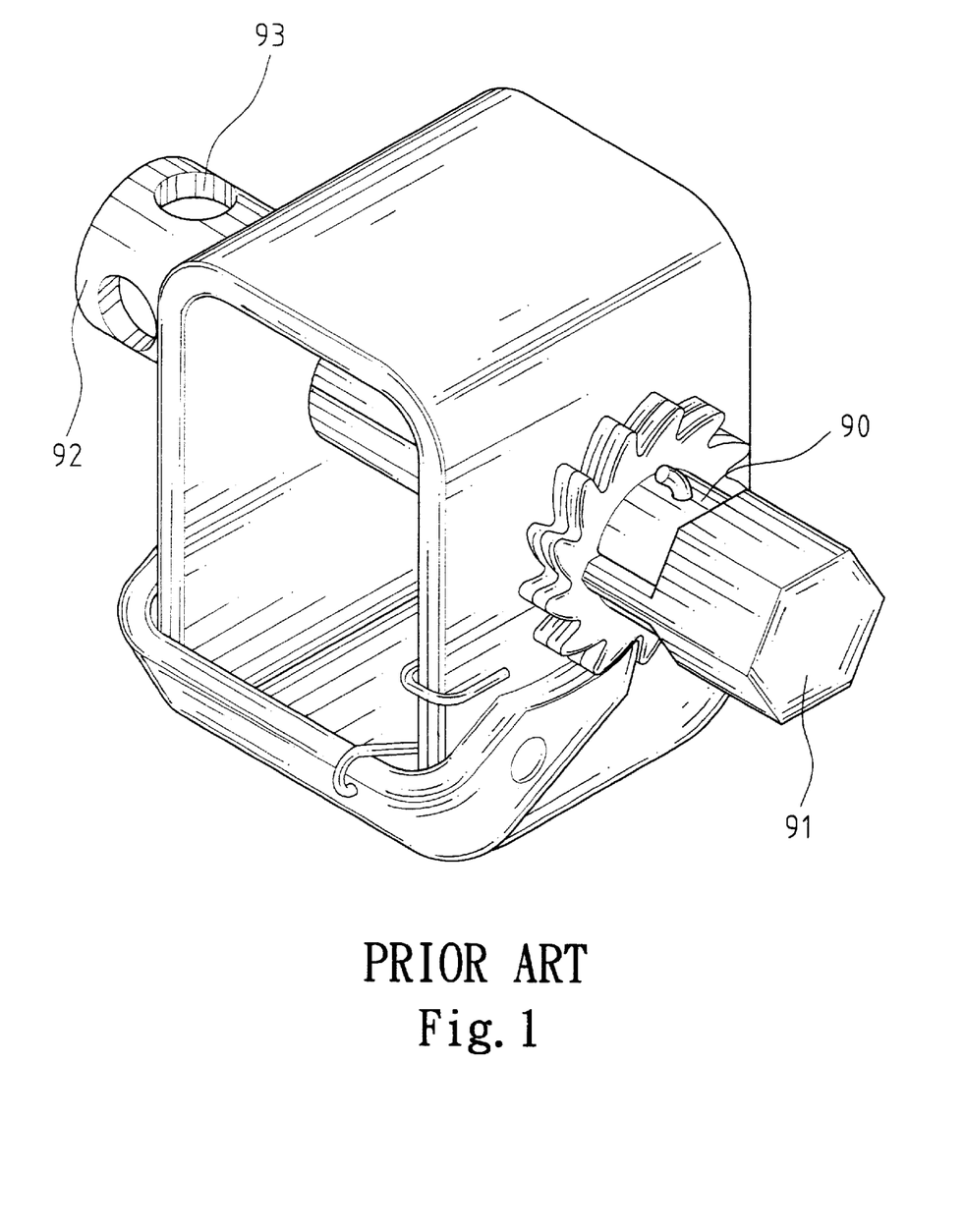
FIG. 1 is a perspective view of a conventional cargo positioning device.
Figure 2:
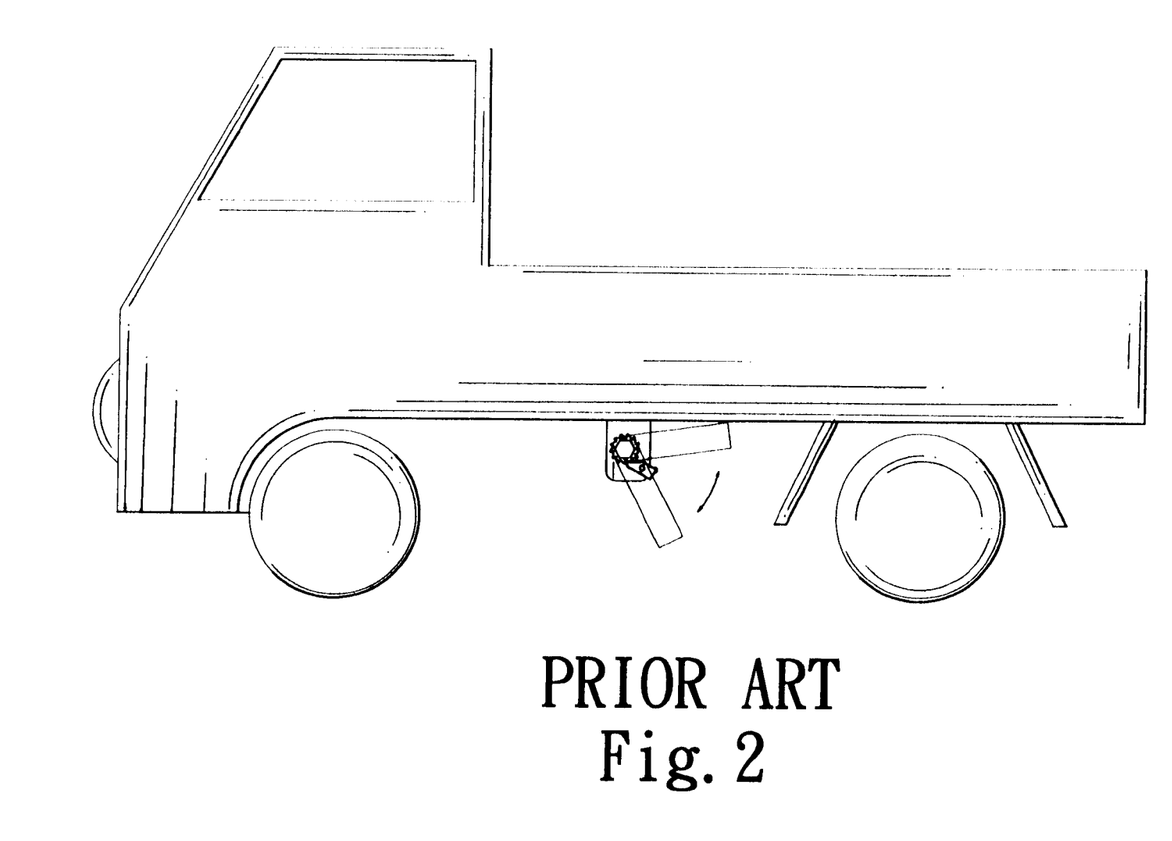
FIG. 2 is a schematic side view illustrating application of the conventional cargo positioning device to a cargo truck.

FIG. 1 of the drawings illustrates a conventional cargo positioning device for tightening the cargo strap. The cargo positioning device includes a hexagonal member 91 secured to an end of a spindle 90 and includes a holed tube 92 secured to the other end of the spindle 90. The user must use either a hexagonal wrench for driving the hexagonal member 91 and the spindle 90 or a handle extended through aligned holes 93 in the tube 92 for driving the spindle 90. This is inconvenient to the user. FIG. 2 of the drawings illustrates application of the cargo positioning device attached to an underside of a deck of a cargo truck. The space for operating the cargo positioning device is relatively small such that it takes considerable time to tighten the cargo strap. It is also inconvenient for the user to attach the hexagonal wrench or handle to the cargo positioning device. In addition, the cargo positioning device occupies considerable space, as it must be sized to bear large torque required during operation of the hexagonal wrench or handle. The overall cost is relatively high, as there are almost twenty (20) cargo positioning devices for a cargo truck.

The present invention is intended to provide a cargo positioning device that mitigates and/or obviates the above problems.

SUMMARY OF THE INVENTION

A cargo positioning device in accordance with the present invention comprises:

- a base including two side walls having aligned first notches and aligned second notches,
- a pivotal member including two side walls and a connecting end adapted to connect with a handle for manual operation, the side walls of the pivotal member including aligned cams, the side walls of the pivotal member further including aligned slots, the side walls of the pivotal member further including aligned restrainers,
- a latch plate having two lateral sides slidably guided in the slots of the pivotal member, respectively, each said lateral side having a catch, an engaging section being formed between the lateral sides of the latch plate,
- a spindle rotatably extended through the side walls of the base, the spindle being connected with the cams on the pivotal member to rotate therewith,
- a cargo strap having an end securely attached to the spindle and releasably wound around the spindle,
- two ratchet wheels mounted on the spindle to rotate therewith, and
- a braking member pivotally mounted to the base and including two side walls each having a braking section for releasably engaging with an associated said ratchet wheel,
- whereby when the engaging section of the latch plate is engaged with the first notches, the catches of the latch plate are disengaged from the ratchet wheels and the cams of the pivotal member urge the braking sections of the braking member to a position disengaged from the ratchet wheels, thereby allowing rapid pulling of the cargo strap,
- whereby when the engaging section of the latch plate is engaged with the second notches, the catches of the latch plate are engaged with the ratchet wheels and the restrainers of the pivotal member urge the braking sections of the braking member to engage with the ratchet wheels, thereby preventing rotation of the spindle, and
- whereby when the engaging section of the latch plate is neither engaged in the first notches nor engaged in the second notches, the catches of the latch plate engage with the ratchet wheels and the braking sections of the braking member are engaged with the ratchet wheels, thereby allowing rotation of the spindle for tightening the cargo strap.

One of the slots of the pivotal member includes a tab formed therein, and the engaging section of the latch plate includes a second slot. A first elastic member includes a main coil portion securely mounted around the tab. The first elastic member further includes a first end attached to an associated side wall of the pivotal member having said tab. The first elastic member further includes a second end with a bend extended from a side of the second slot of the engaging section to the other side of the second slot, thereby biasing the catches of the latch plate toward the ratchet wheels.

The braking member is pivotally mounted to the base by a pin. A second elastic member includes a main coil portion mounted around the pin. The second elastic member further includes a first hook end attached to an underside of one of the side walls of the base. The elastic member further includes a second hook end attached to an underside of the braking member, thereby biasing the braking sections of the braking member to engage with the ratchet wheels.

Each ratchet wheel includes a central hole with a cross beam extended therein, thereby defining an upper opening and a lower opening. The spindle includes two spindle halves extended through the upper opening and the lower opening of each ratchet wheel, respectively, thereby securely engaging the ratchet wheels with the spindle and defining a gap between the spindle halves.

In a preferred embodiment of the invention, the handle is integrally formed on the pivotal member for convenient operation.

Other objects, advantages, and novel features of the invention will become more apparent from the following detailed description when taken in conjunction with the accompanying drawings.

DETAILED DESCRIPTION OF THE PREFERRED EMBODIMENTS

Figure 3:
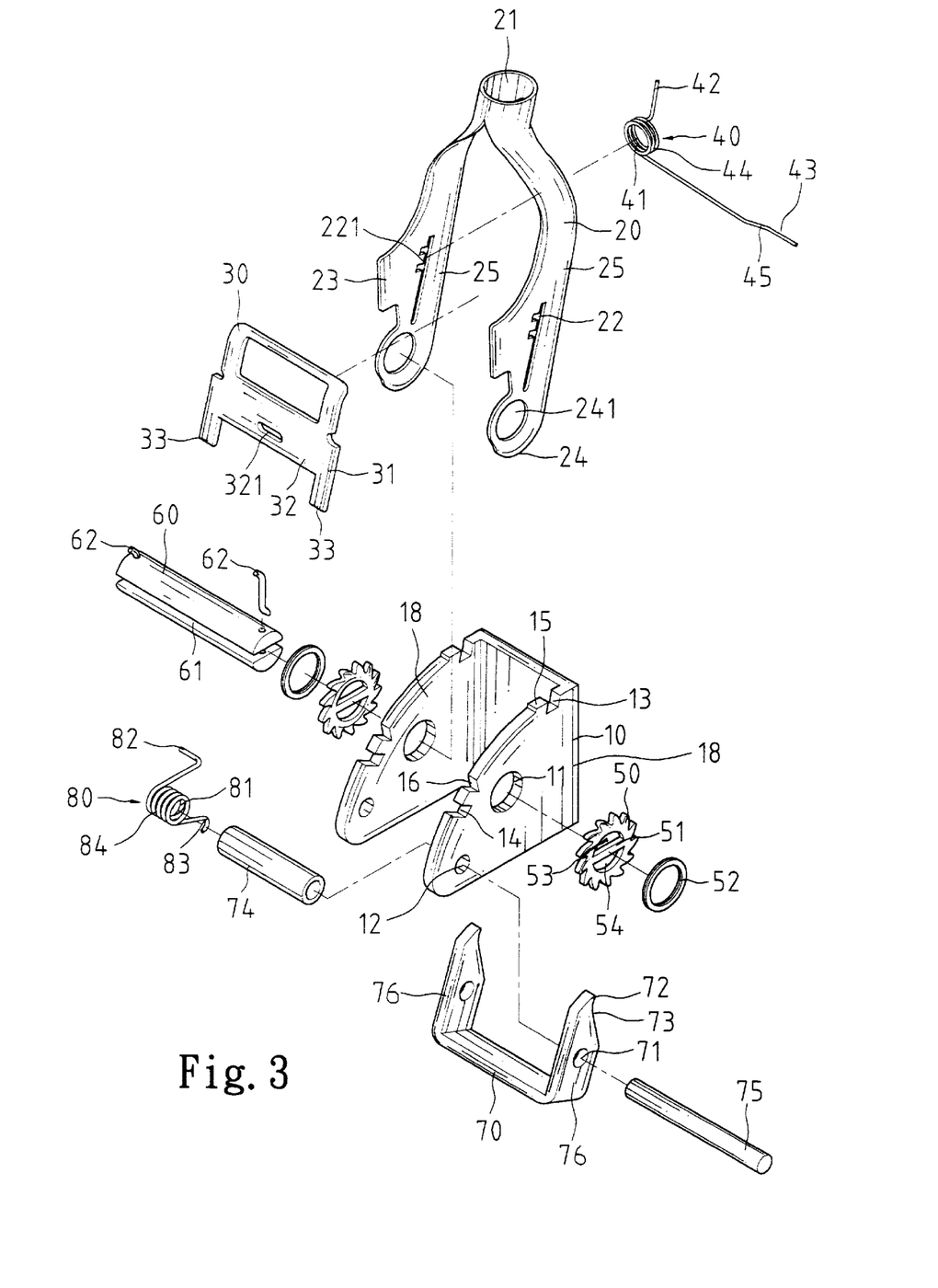
FIG. 3 is an exploded perspective view of a cargo positioning device in accordance with the present invention.
Figure 4:
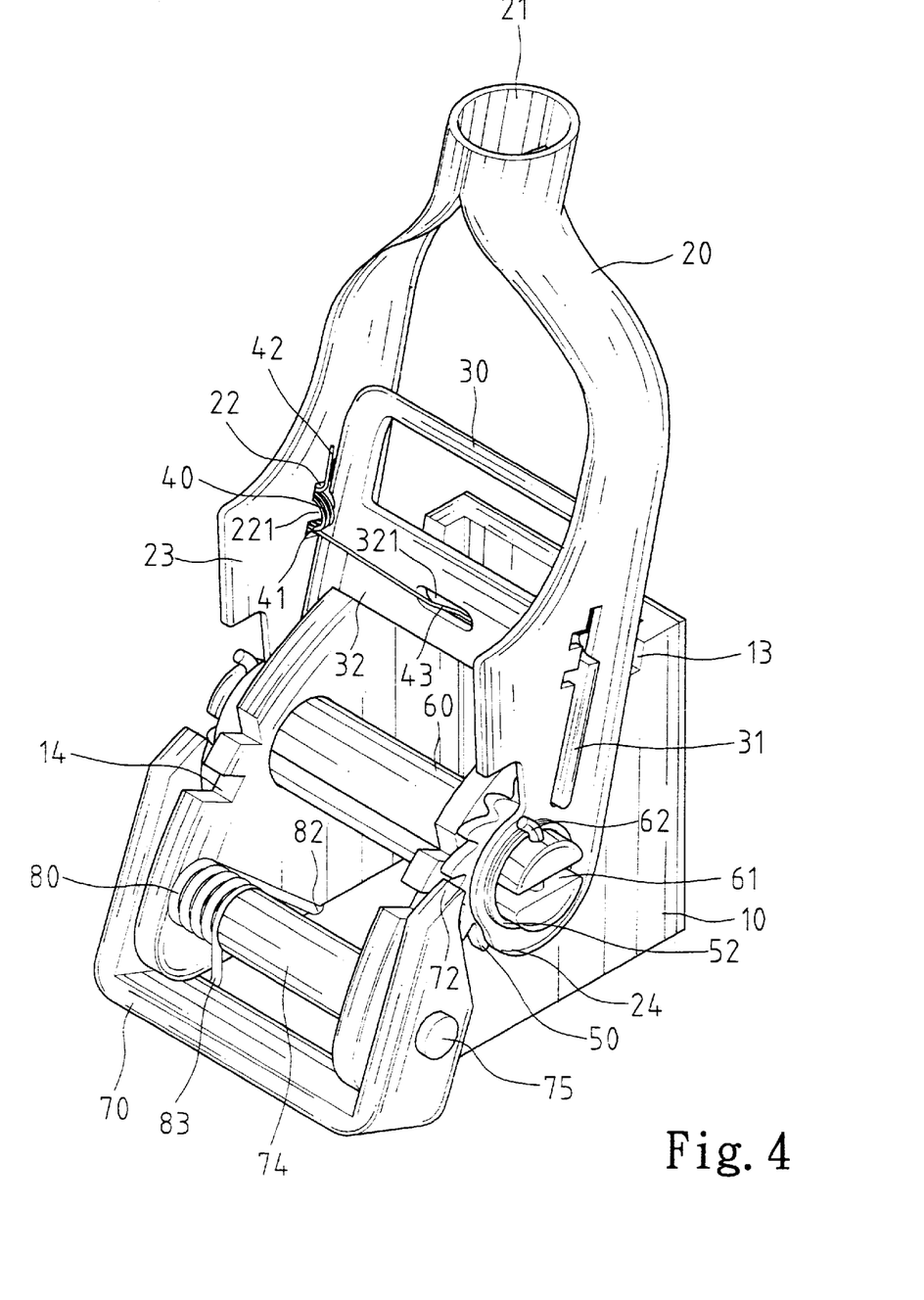
FIG. 4 is a perspective view of the cargo positioning device in accordance with the present invention.

Referring to FIGS. 3 through 12 and initially to FIGS. 3 and 4, a cargo positioning device in accordance with the present invention generally includes a substantially U-shape base 10 having two side walls 18 having aligned first holes 11 and aligned second holes 12. The side walls 18 further include aligned first notches 13 and aligned second notches 14. In addition, aligned first stops 15 and aligned second stops 16 are formed on the side walls 18 and preferably located between notch 13 and notch 14.

A pivotal member 20 includes a connecting end 21 to which a handle 211 is attached. The pivotal member 20 includes two side walls 25 having aligned slots 22. A lateral side defining each side wall 25 of the pivotal member 20 has a tab 221 formed by means of cutting two spaced recesses (not labeled). The side walls 25 have aligned restrainers 23 and aligned cams 24 with aligned pivotal holes 241. The pivotal holes 241 are aligned with the holes 11 on the base 10.

A latch plate 30 includes two lateral sides 31 slidably engaged in the slots 22 of the pivotal member 20 and includes an engaging section 32 between the lateral sides 31. A slot 321 is defined in the engaging section 32. Each lateral side 31 has a lower end 33 that acts as a catch.

An elastic member 40 includes a main coil portion 44 with a longitudinal hole 41, a first end 42, and a second end 43 that is longer and has a bend 45. The main portion 44 of the elastic member 40 is mounted around the tab 221 of one of the slots 22 with the first end 42 bearing against an inner side of the associated side wall 25 of the pivotal member 20 (FIG. 4) and with the bend 45 extended from a side of the slot 22 to the other side of the slot 22 and with the distal end portion of the second end 43 bearing against a rear side of the engaging section 32.

The ratchet wheels 50 are mounted to outer sides of the side walls 18 of the base 10, respectively. Preferably, each ratchet wheel 50 is mounted between an associated side wall 18 of the base 10 and an associated cam 24 of the pivotal member 20. A washer 52 is mounted outside each cam 24. Each ratchet wheel 50 includes a central hole (not labeled) with a cross beam 51 extended therein, thereby defining an upper opening 53 and a lower opening 54 on two sides of the transverse beam 51, respectively.

A spindle 60 includes two spindle halves (not labeled) that are secured together by zigzag pins 62 to thereby define a gap 61 between the spindle halves. An end of a cargo strap is securely attached to the spindle 60 so as to be wound around the spindle 60. The spindle 60 extends through the holes 11 and 241 while each spindle half being extended through associated openings 53, 54 of the ratchet wheels 50. Thus, the ratchet wheels 50 and the spindle 60 may rotate synchronously and the pivotal member 20 is pivotally connected to the base 10. In addition, the lower ends 33 (the catches) of the lateral sides 31 of the latch plate 30 are biased by the elastic member 40 to engage with the ratchet teeth of the ratchet wheels 50.

A substantially U-shape braking member 70 includes two side walls 76 having aligned pivotal holes 71 through which a pin 75 extends. Each side wall 76 includes a braking section 72 with an arcuate surface 73 formed therebelow. An elastic member 80 includes a main coil portion 84 with a longitudinal hole 81, a first hook end 82, and a second hook end 83. The pin 75 extends through the pivotal holes 71 of the braking member 70, the holes 12 of the base 10, and a sleeve 74 mounted between the side walls 18 of the base 10, thereby pivotally mounting the braking member 70 to the base 10. The braking sections 72 of the braking member 70 engage with the ratchet teeth of the ratchet wheels 50. The first hook end 82 of the elastic member 80 is attached to an underside of a side wall 18 of the base 10, and the second hook end 83 of the elastic member 80 is attached to an underside of a mediate portion of the braking member 70 (FIG. 6).

Figure 5:
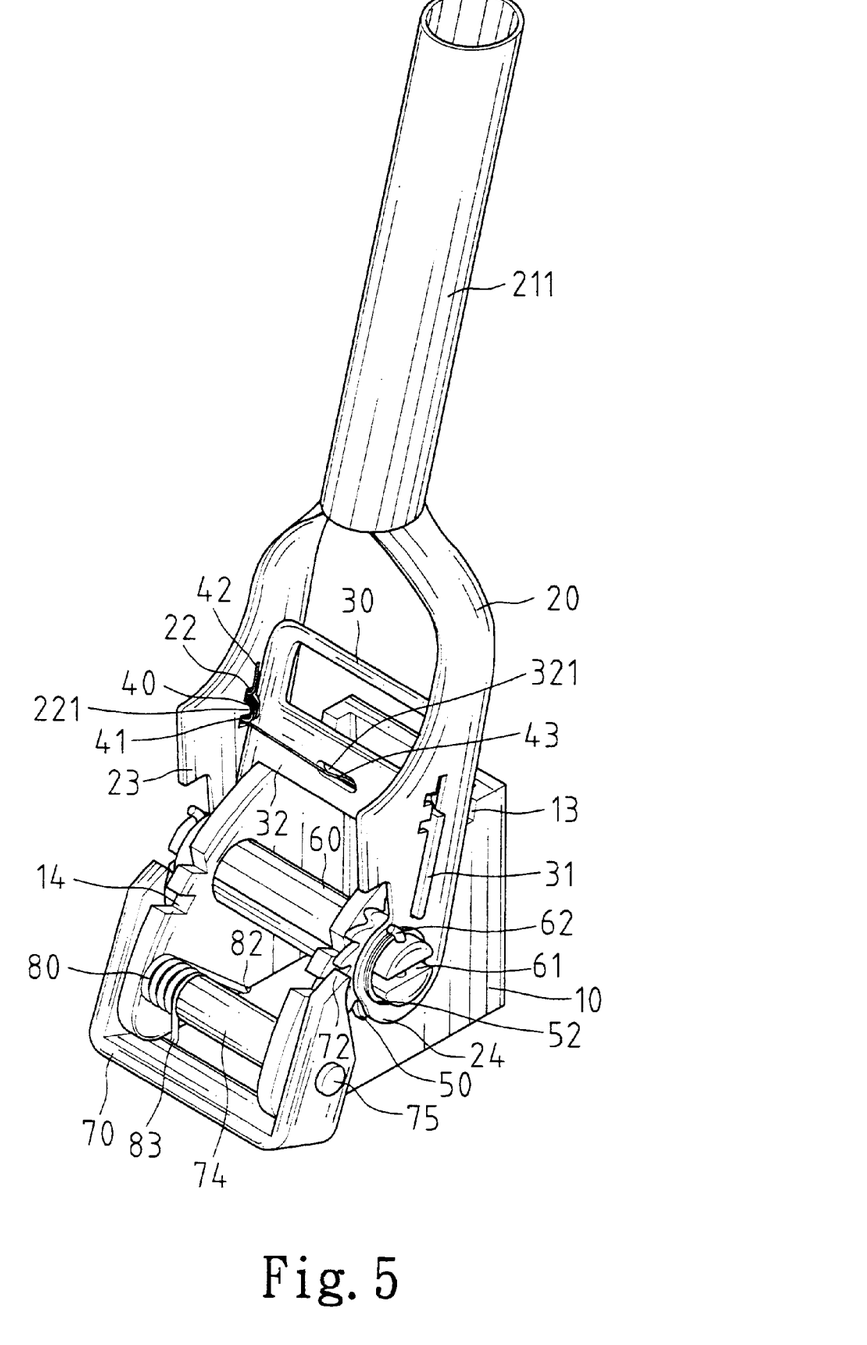
FIG. 5 is a perspective view of a modified embodiment of the cargo positioning device in accordance with the present invention.

FIG. 5 is a perspective view of a modified embodiment of the cargo positioning device, wherein a handle 211 is directly formed on the connecting end 21 to provide easy operation for the user.

Figure 6:
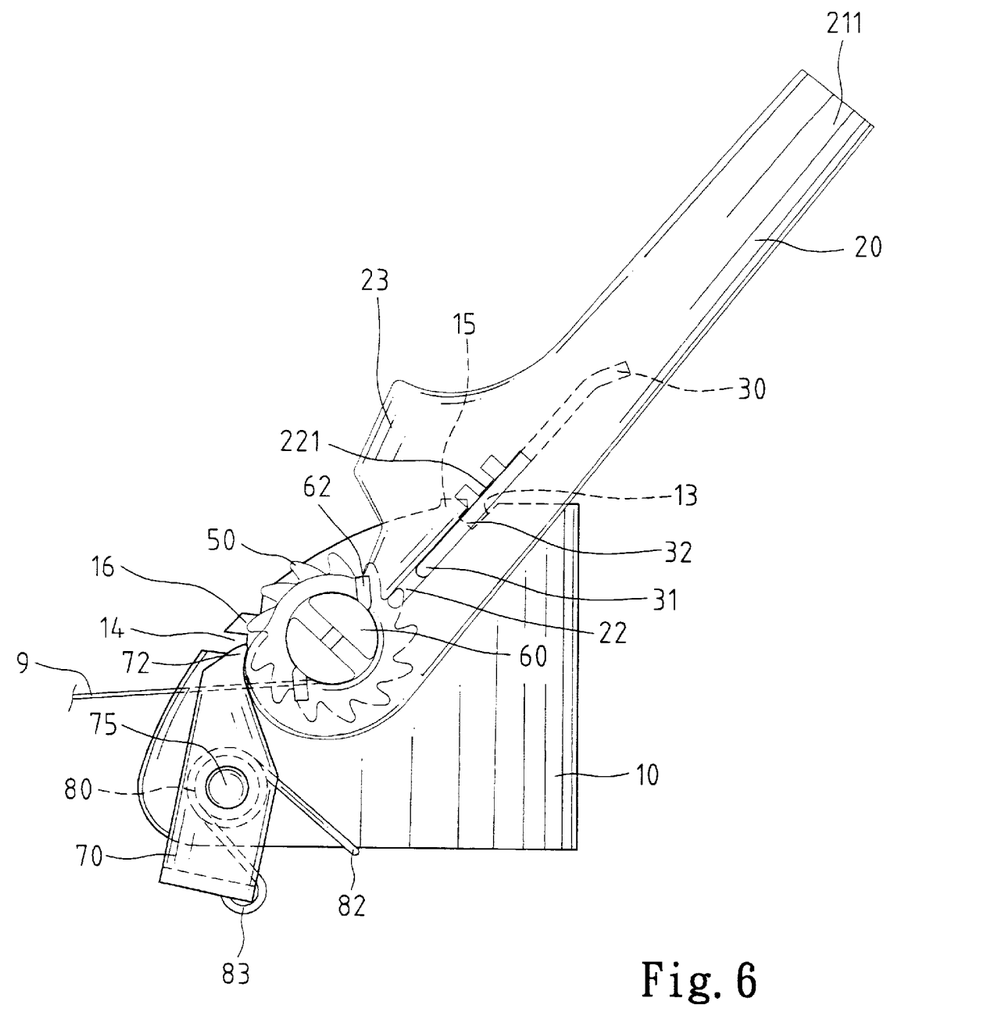
FIG. 6 is a schematic side view of the cargo positioning device in FIG. 5, wherein the cargo positioning device is in a status allowing rapid pulling of the cargo strap.

In operation, referring to FIG. 6, the latch plate 30 is lifted upward such that the lower ends 33 (the catches) of the lateral sides 31 of the latch plate 30 are disengaged from the ratchet wheels 50. The engaging section 32 is recessed to allow the latch plate 30 to pass through the stops 15 of the base 10 when the pivotal member 20 is pivoted. Then, the latch plate 30 is released such that the engaging section 32 is engaged with the notches 13. Thus, the pivotal member 20 is retained in a certain angular relationship with the base 10, wherein the cams 24 of the pivotal member 20 actuate the braking member 70 to a position such that the braking sections 72 of the braking member 70 do not engage with the ratchet wheels 50. Accordingly, the ratchet wheels 50 are now freely rotatable to allow free, rapid pulling of the cargo strap 9 to a desired position for roughly tightening the cargo.

Figure 7:
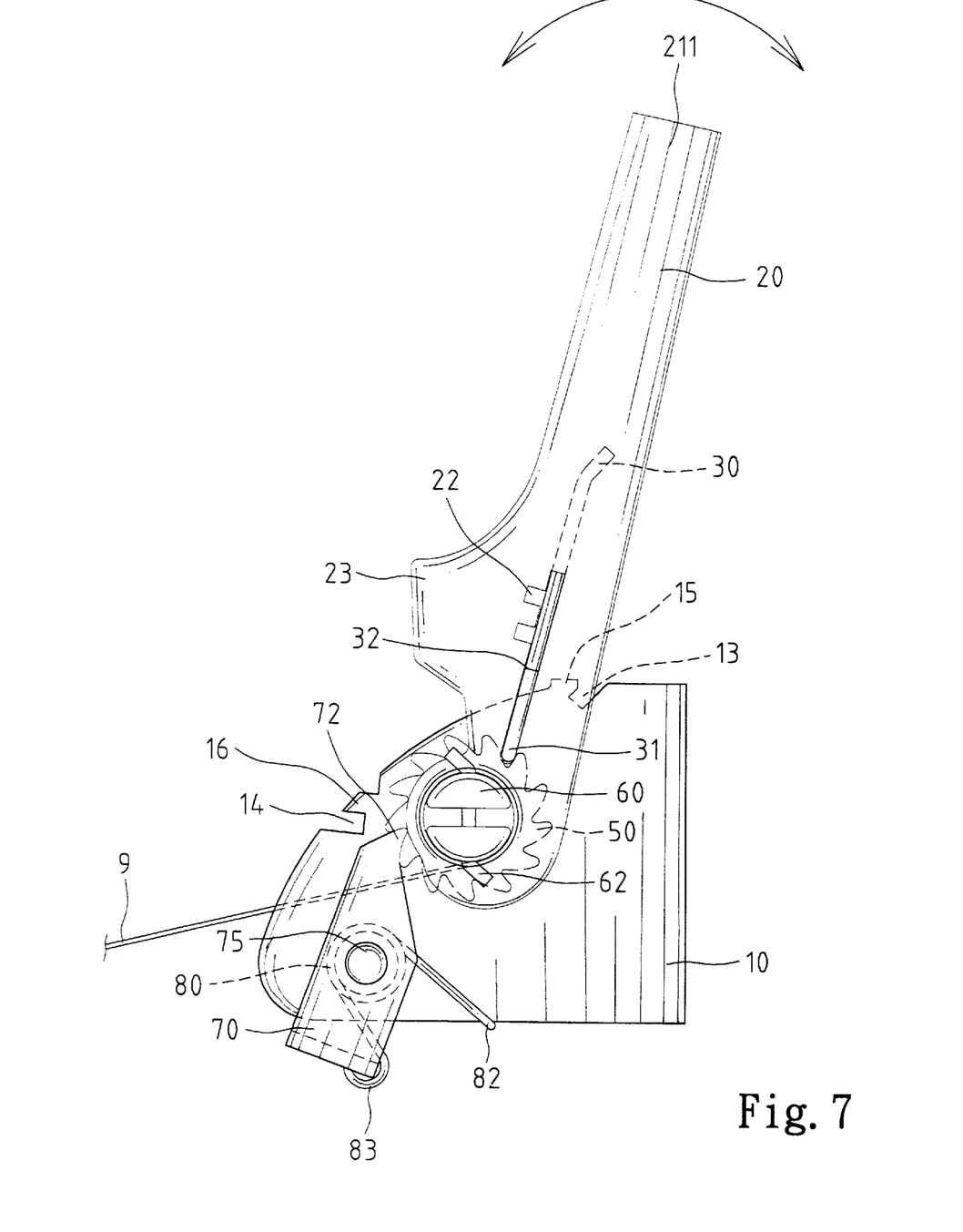
FIGS. 7 through 9 are side views illustrating slow operation of the handle of the cargo positioning device for tightening the cargo strap.
Figure 8:
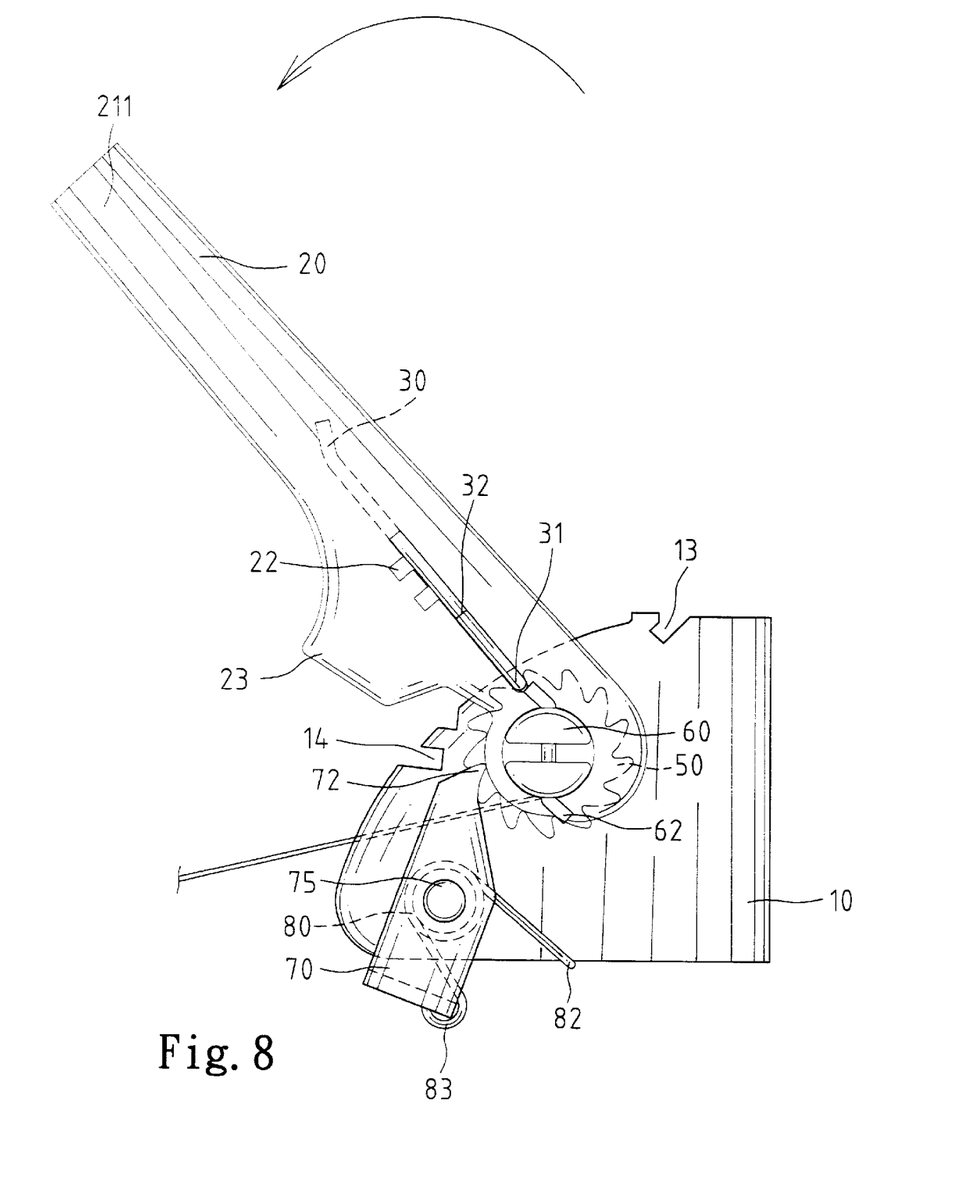
Figure 9:
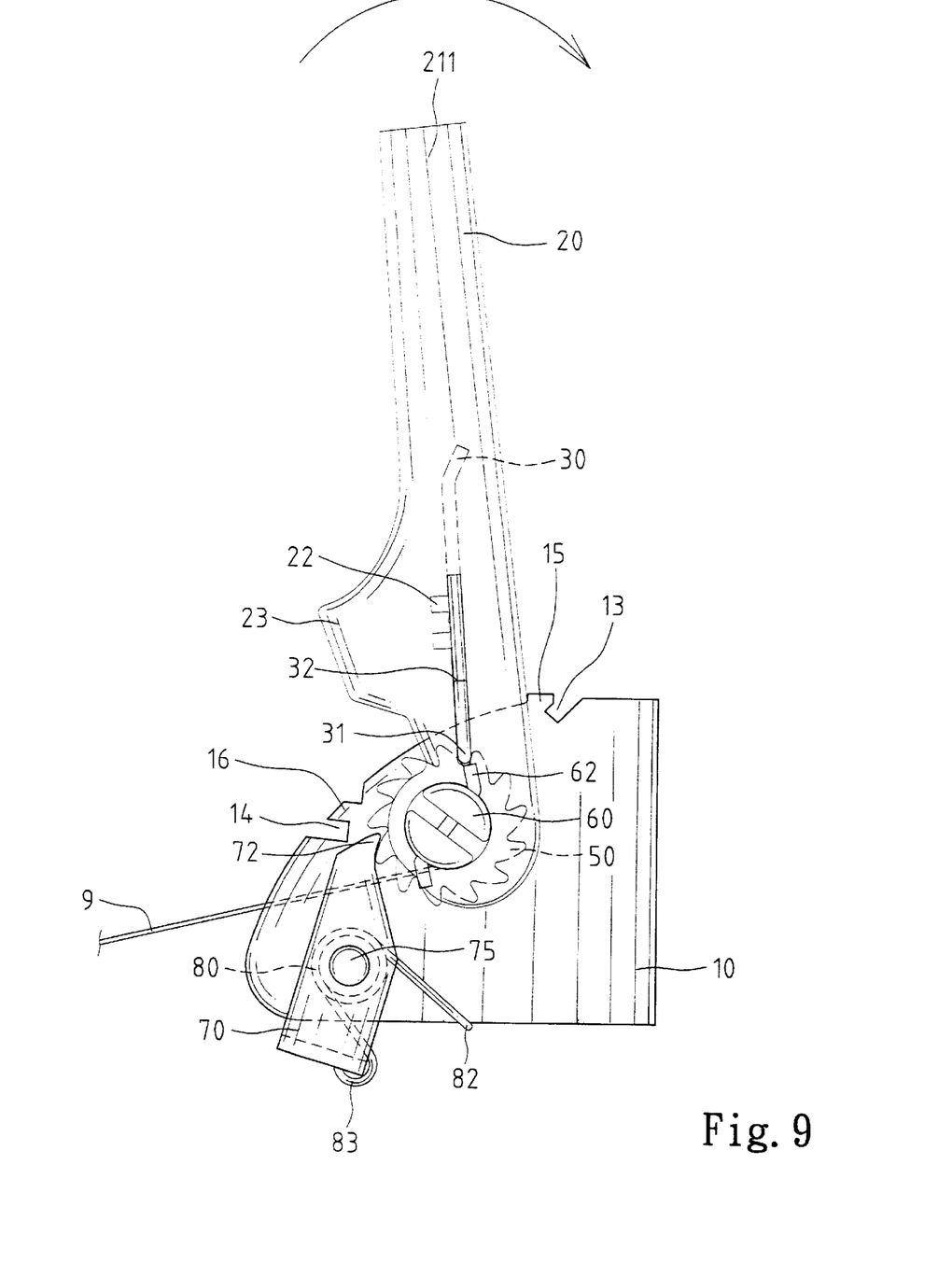
Figure 10:
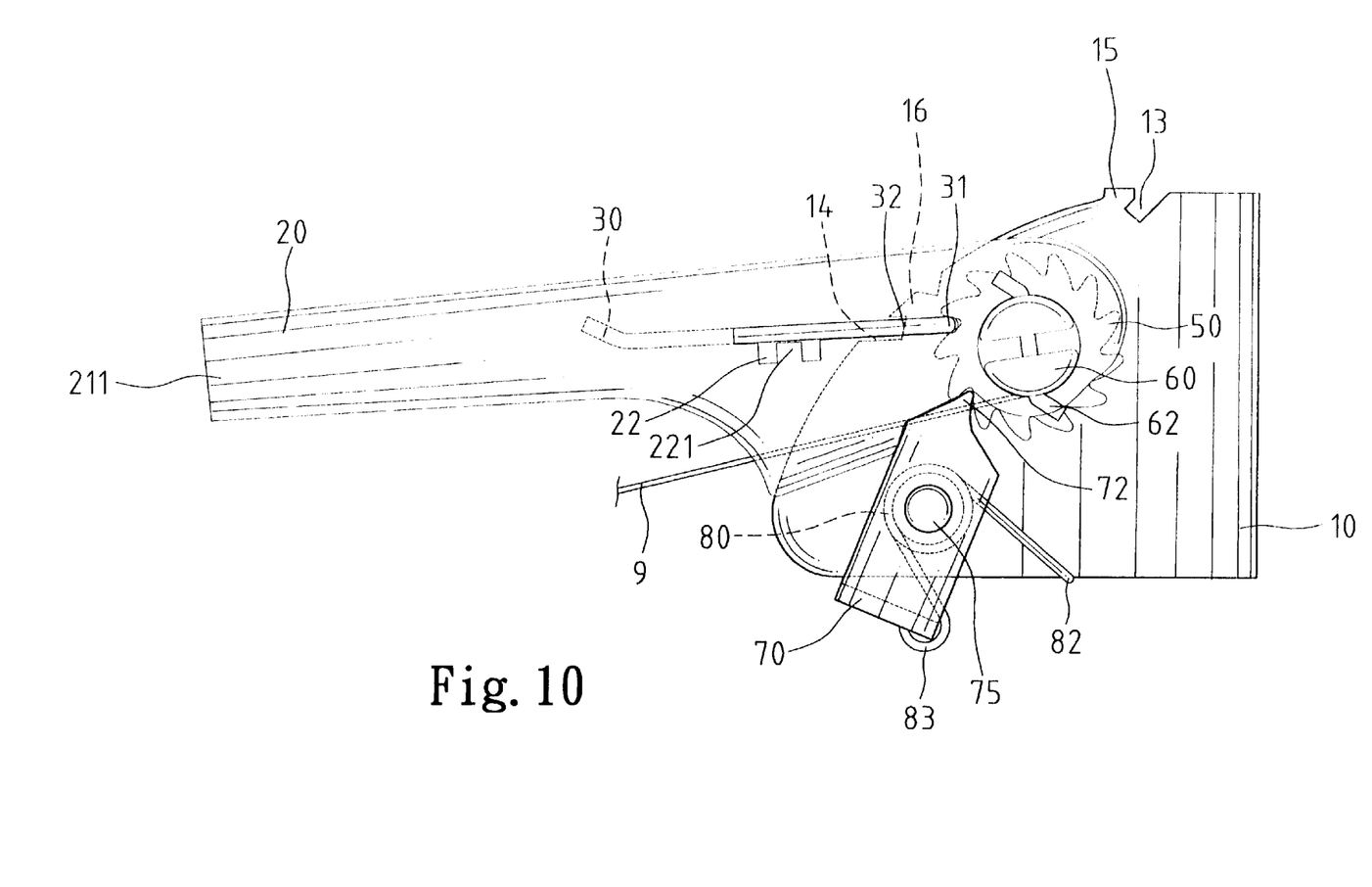
FIG. 10 is a schematic side view of the cargo positioning device in FIG. 5, wherein the cargo positioning device is in a status that retains the cargo strap in place.

Referring to FIG. 7, when further tightening of the cargo strap 9 is required, the latch plate 30 is lifted upward to cause disengagement of the engaging section 32 from the notches 13. Next, the pivotal member 20 is pivoted to a position in which the cams 24 disengage from the braking sections 72 of the braking member 70. The braking sections 72 of the braking member 70 are biased by the elastic member 80 to engage with the ratchet teeth of the ratchet wheels 50. Then, the latch plate 30 is released such that the lower ends 33 (the catches) of the lateral sides 31 of the latch plate 30 engage with the ratchet teeth of the ratchet wheels 50. In this status, the user may reciprocatingly operate the handle 21 (FIGS. 8 and 9) until the cargo strap 9 reaches certain tightness for securely tightening the cargo in place. It is appreciated that the pivotal member 20 is pivotally moved between the stops 15 and stops 16. The cargo strap 9 remains still when the handle 211 is moved counterclockwise (FIG. 8). The cargo strap 9 is moved and thus further tightened when the handle 211 is moved clockwise (FIG. 9).

After the final tightening operation (FIGS. 7 through 9), the latch plate 30 is lifted upward such that the lower ends 33 (the catches) of the lateral sides 31 of the latch plate 30 disengage from the ratchet wheels 50. The pivotal member 20 is pivoted to pass through the stops 16 until the latch plate 30 reaches a position adjacent to the notches 14. The latch plate 30 is then released such that the engaging section 32 of the latch plate 30 is securely retained in the notches 14 under the action of the elastic member 40. In addition, the pivotal member 20 is retained in an inclined angle with respect to the base 10 such that the braking member 70 is actuated by the restrainers 23 on the pivotal member 20, thereby urging the braking sections 72 to engage with the ratchet teeth of the ratchet wheels 50. Thus, the ratchet wheels 50 are braked and thus cannot be rotated.

Figure 11:
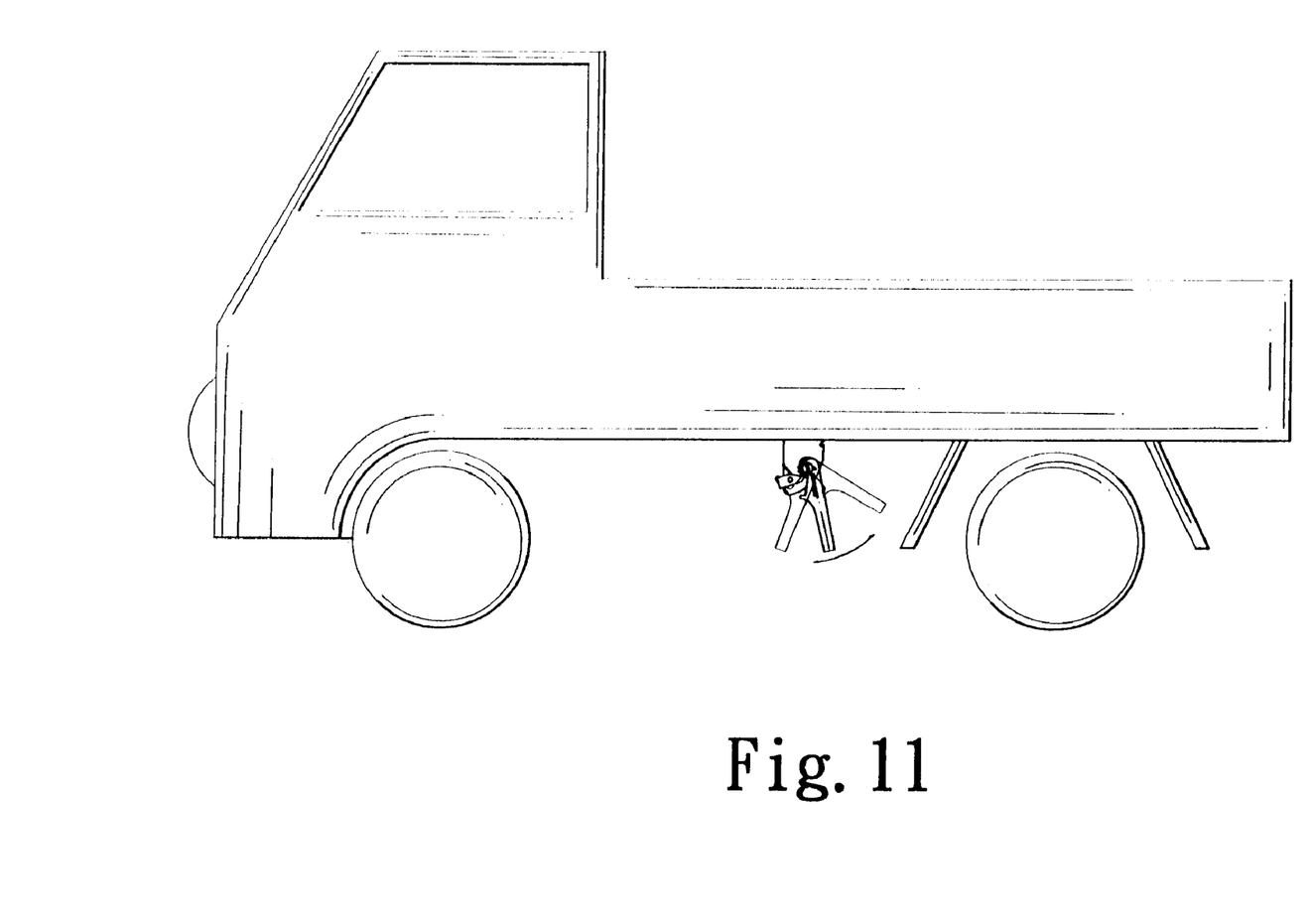
FIG. 11 is a schematic side view illustrating application of the cargo positioning device in accordance with the present invention to a cargo truck.
Figure 12:
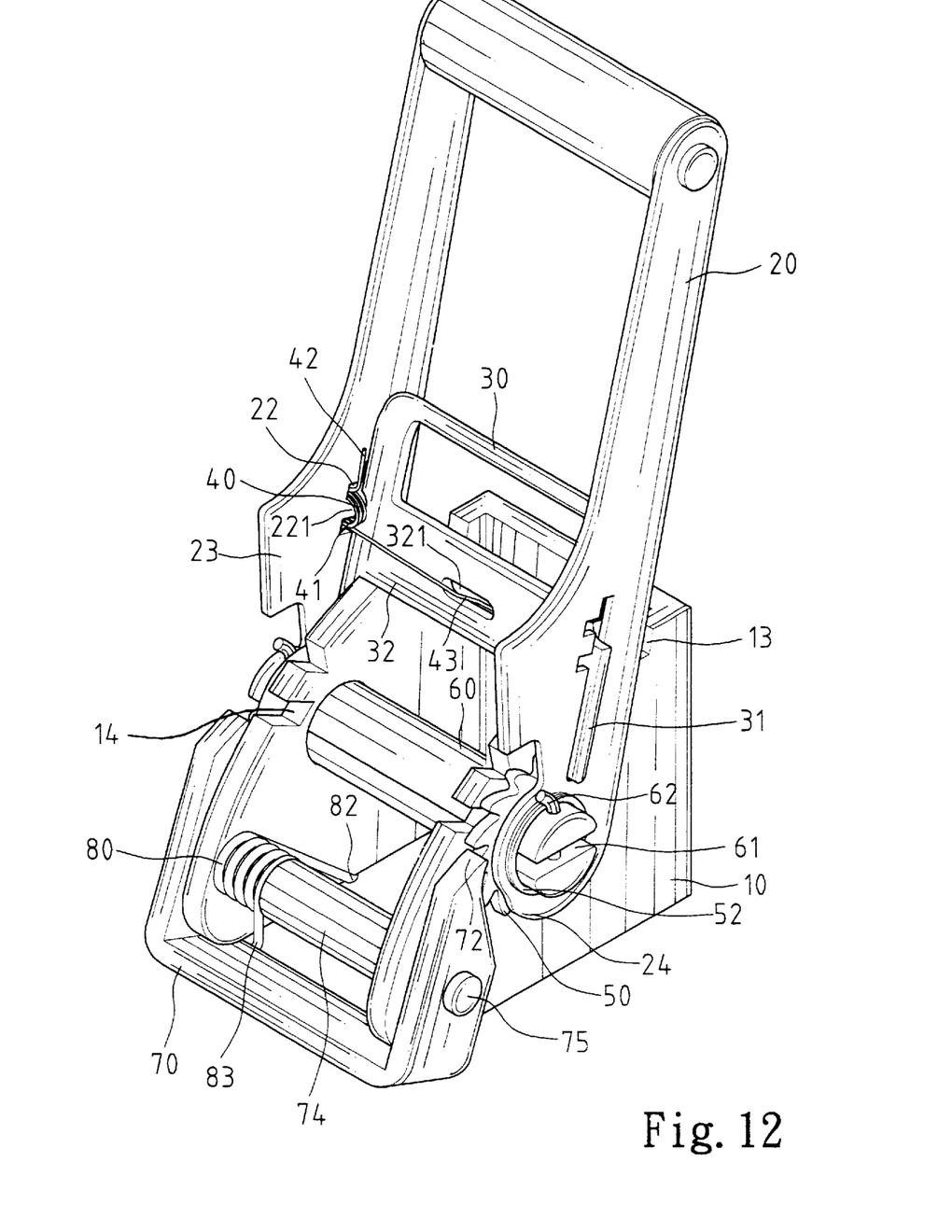
FIG. 12 is a perspective view illustrating a further modified embodiment of the cargo positioning device in accordance with the present invention.

FIG. 11 illustrates application of the cargo positioning device to an underside of a deck of a cargo truck, wherein the pivotal member 20 is installed to extend downwardly for easy attachment of a handle or the handle directly formed on the pivotal member 20 can be conveniently operated by the user. FIG. 12 illustrates a modified embodiment of the cargo positioning device, wherein the pivotal member 20 is modified to have a handgrip for easy grasp and operation.

Although the invention has been explained in relation to its preferred embodiment, it is to be understood that many other possible modifications and variations can be made without departing from the spirit and scope of the invention as hereinafter claimed.

What is claimed is:

1. A cargo positioning device comprising:

a base including two side walls having aligned first notches and aligned second notches, a pivotal member including two side walls and a connecting end adapted to connect with a handle for manual operation, the side walls of the pivotal member including aligned cams, the side walls of the pivotal member further including aligned slots, the side walls of the pivotal member further including aligned restrainers, a latch plate having two lateral sides slidably guided in the slots of the pivotal member, respectively, each said lateral side having a catch, an engaging section being formed between the lateral sides of the latch plate, a spindle rotatably extended through the side walls of the base, the spindle being connected with the cams on the pivotal member to rotate therewith, a cargo strap having an end securely attached to the spindle and releasably wound around the spindle, two ratchet wheels mounted on the spindle to rotate therewith, and a braking member pivotally mounted to the base and including two side walls each having a braking section for releasably engaging with an associated said ratchet wheel, whereby when the engaging section of the latch plate is engaged with the first notches, the catches of the latch plate are disengaged from the ratchet wheels and the cams of the pivotal member urge the braking sections of the braking member to a position disengaged from the ratchet wheels, thereby allowing rapid pulling of the cargo strap, whereby when the engaging section of the latch plate is engaged with the second notches, the catches of the latch plate are engaged with the ratchet wheels and the restrainers of the pivotal member urge the braking sections of the braking member to engage with the ratchet wheels, thereby preventing rotation of the spindle, and whereby when the engaging section of the latch plate is neither engaged in the first notches nor engaged in the second notches, the catches of the latch plate engage with the ratchet wheels and the braking sections of the braking member are engaged with the ratchet wheels, thereby allowing rotation of the spindle for tightening the cargo strap.

2. The cargo positioning device as claimed in claim 1, wherein one of the slots of the pivotal member includes a tab formed therein, and the engaging section of the latch plate includes a second slot, further comprising an elastic member including a main coil portion securely mounted around the tab, the elastic member further including a first end attached to an associated said side wall of the pivotal member having said tab, the elastic member further including a second end with a bend extended from a side of the second slot of the engaging section to the other side of the second slot, thereby biasing the catches of the latch plate toward the ratchet wheels.

3. The cargo positioning device as claimed in claim 1, wherein the braking member is pivotally mounted to the base by a pin, further comprising an elastic member including a main coil portion mounted around the pin, the elastic member further including a first hook end attached to an underside one of the side walls of the base, the elastic member further including a second hook end attached to an underside of the braking member, thereby biasing the braking sections of the braking member to engage with the ratchet wheels.

4. The cargo positioning device as claimed in claim 1, wherein each said ratchet wheel includes a central hole with a cross beam extended therein, thereby defining an upper opening and a lower opening, and wherein the spindle includes two spindle halves extended through the upper opening and the lower opening of each said ratchet wheel, respectively, thereby securely engaging the ratchet wheels with the spindle and defining a gap between the spindle halves.

5. A cargo positioning device comprising:

a base including two side walls having aligned first notches and aligned second notches, a pivotal member including two side walls and a handle integrally formed with the side walls of the pivotal member for manual operation, the side walls of the pivotal member including aligned cams, the side walls of the pivotal member further including aligned slots, the side walls of the pivotal member further including aligned restrainers, a latch plate having two lateral sides slidably guided in the slots of the pivotal member, respectively, each said lateral side having a catch, an engaging section being formed between the lateral sides of the latch plate, a spindle rotatably extended through the side walls of the base, the spindle being connected with the cams on the pivotal member to rotate therewith, a cargo strap having an end securely attached to the spindle and releasably wound around the spindle, two ratchet wheels mounted on the spindle to rotate therewith, and a braking member pivotally mounted to the base and including two side walls each having a braking section for releasably engaging with an associated said ratchet wheel, whereby when the engaging section of the latch plate is engaged with the first notches, the catches of the latch plate are disengaged from the ratchet wheels and the cams of the pivotal member urge the braking sections of the braking member to a position disengaged from the ratchet wheels, thereby allowing rapid pulling of the cargo strap, whereby when the engaging section of the latch plate is engaged with the second notches, the catches of the latch plate are engaged with the ratchet wheels and the restrainers of the pivotal member urge the braking sections of the braking member to engage with the ratchet wheels, thereby preventing rotation of the spindle, and whereby when the engaging section of the latch plate is neither engaged in the first notches nor engaged in the second notches, the catches of the latch plate engage with the ratchet wheels and the braking sections of the braking member are engaged with the ratchet wheels, thereby allowing rotation of the spindle for tightening the cargo strap.

6. The cargo positioning device as claimed in claim 5, wherein one of the slots of the pivotal member includes a tab formed therein, and the engaging section of the latch plate includes a second slot, further comprising an elastic member including a main coil portion securely mounted around the tab, the elastic member further including a first end attached to an associated said side wall of the pivotal member having said tab, the elastic member further including a second end with a bend extended from a side of the second slot of the engaging section to the other side of the second slot, thereby biasing the catches of the latch plate toward the ratchet wheels.

7. The cargo positioning device as claimed in claim 5, wherein the braking member is pivotally mounted to the base by a pin, fatter comprising an elastic member including a main coil portion mounted around the pin, the elastic member further including a first hook end attached to an underside of one of the side walls of the base, the elastic member further including a second hook end attached to an underside of the braking member, thereby biasing the braking sections of the braking member to engage with the ratchet wheels.

8. The cargo positioning device as claimed in claim 5, wherein each said ratchet wheel includes a central hole with a cross beam extended therein, thereby defining an upper opening and a lower opening, and wherein the spindle includes two spindle halves extended through the upper opening and the lower opening of each said ratchet wheel, respectively, thereby securely engaging the ratchet wheels with the spindle and defining a gap between the spindle halves.

* * * * *